R. H. WILSON.
CAR FENDER.
APPLICATION FILED FEB. 16, 1916.
1,204,222.
Patented Nov. 7, 1916.
2 SHEETS—SHEET 1.
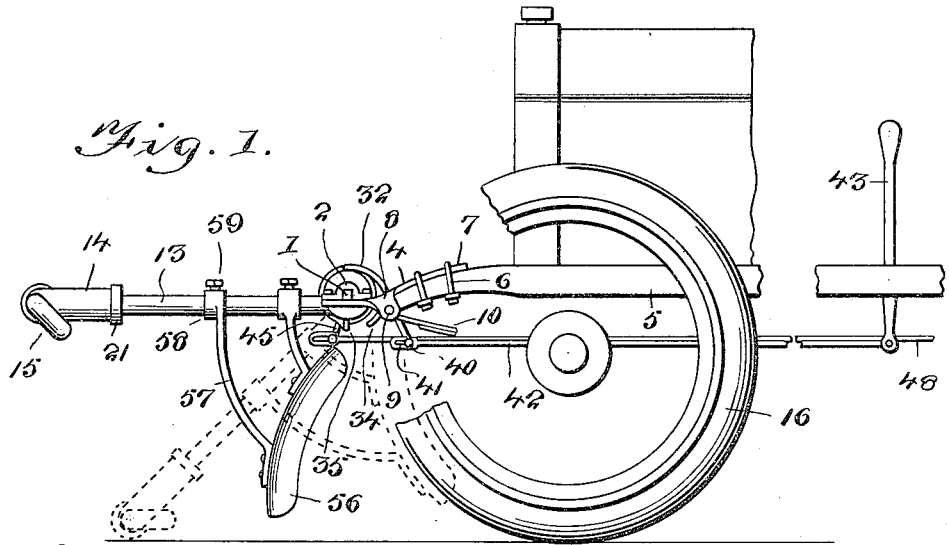
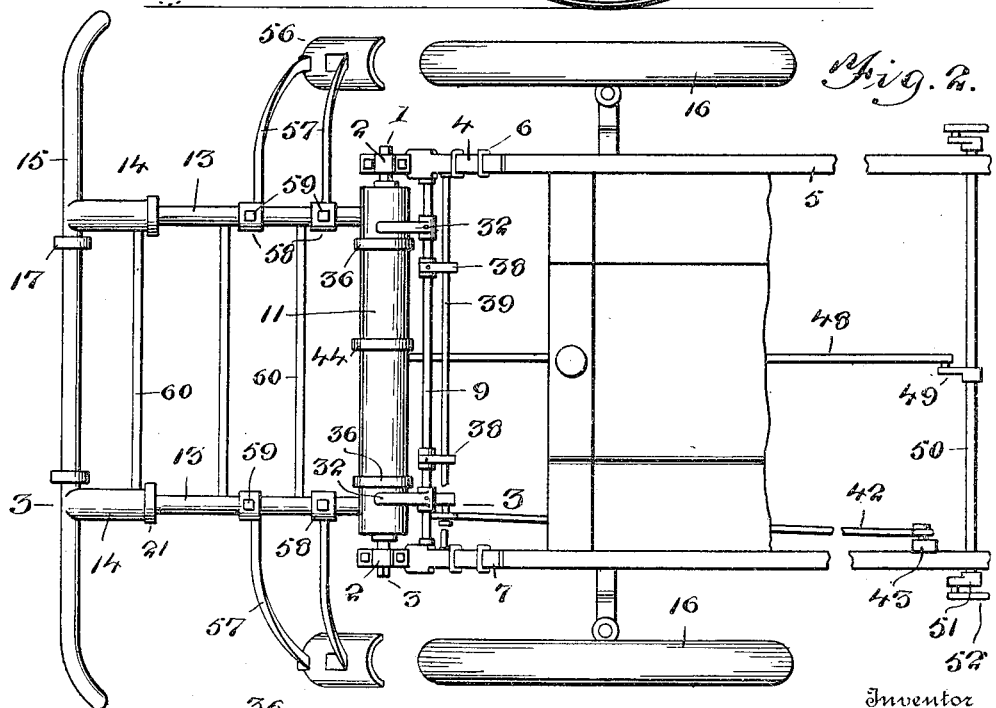
Inventor
R. H. Wilson
By Victor J. Evans
Attorney

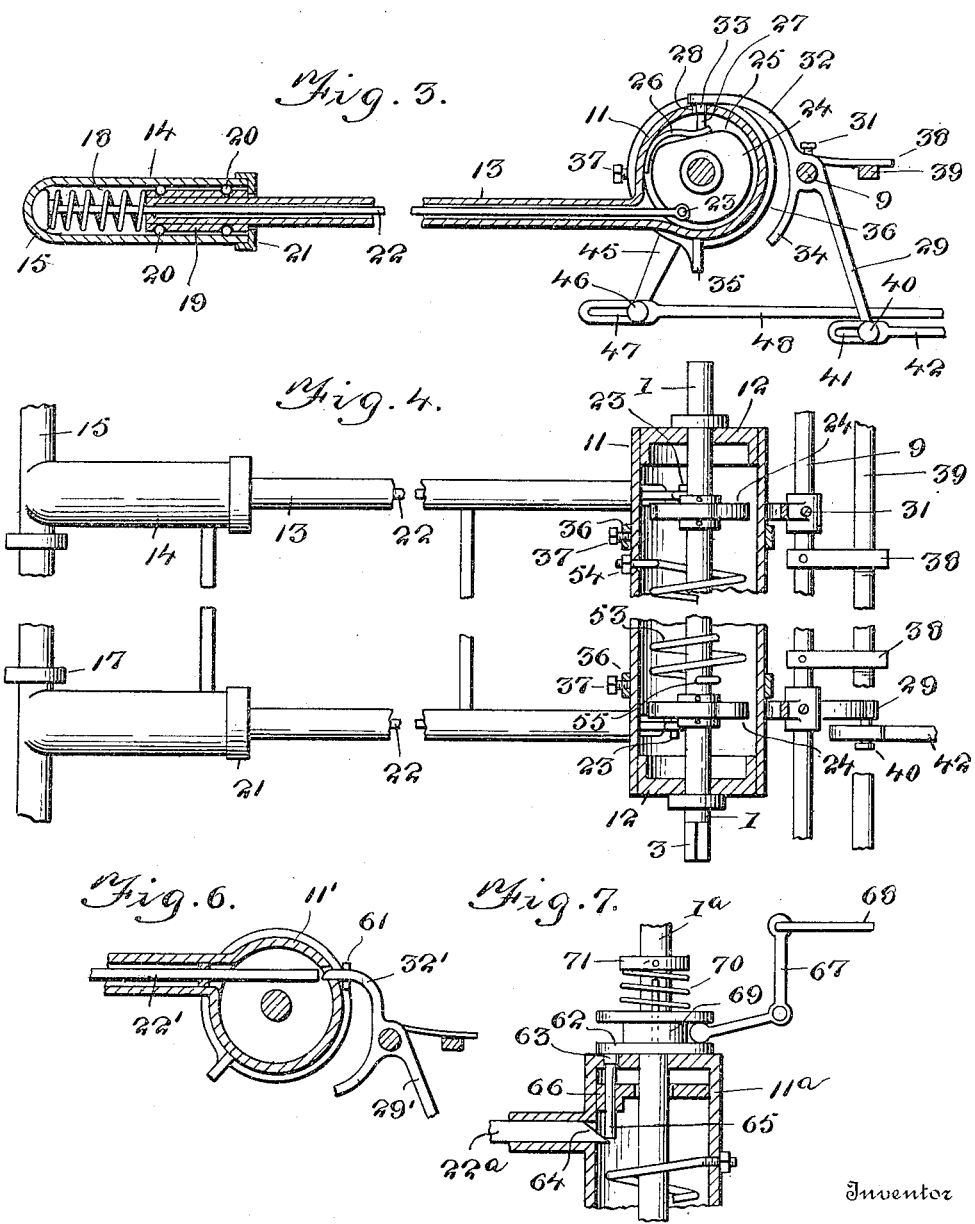

UNITED STATES PATENT OFFICE.

ROBERT H. WILSON, OF TACOMA, WASHINGTON.

CAR-FENDER.

1,204,222.  Specification of Letters Patent.  Patented Nov. 7, 1916.

Application filed February 16, 1916. Serial No. 78,720.

*To all whom it may concern:*

Be it known that I, ROBERT H. WILSON, a citizen of the United States, residing at Tacoma, in the county of Pierce and State of Washington, have invented new and useful Improvements in Car-Fenders, of which the following is a specification.

This invention relates to car fenders and while applicable to any motor vehicle, the present embodiment of the invention is especially designed for use on automobiles, motor trucks and the like.

The object of the invention is to produce a simple, reliable and attractive fender which is normally sustained in an elevated position to give ample road clearance, combined with means whereby the fender is automatically tripped by contact with a person or object and allowed to drop to a depressed or catching position for the purpose of preventing the person or object from being struck by the machine or getting under the wheels thereof.

A further object in view is to provide means whereby the operator of the machine may quickly release the fender from its elevated position and allow the same to drop to its catching position, the said manually controlled means being operable independently of the automatic tripping means.

Another object of the invention is to provide novel means for adjustably limiting the extent of downward movement of the fender; also to provide means whereby the fender, when depressed, throws the brake mechanism of the vehicle into operation.

With the above and other objects in view, the invention consists in the novel construction, combination and arrangement of parts, as herein described, illustrated and claimed.

In the accompanying drawings:—Figure 1 is a side elevation partly broken away of a sufficient portion of an automobile to illustrate the fender of this invention in its applied relation thereto. Fig. 2 is a plan view of the same also illustrating the connection between the fender and the brake mechanism. Fig. 3 is an enlarged vertical longitudinal section on the line 3—3 of Fig. 2. Fig. 4 is a section taken diametrically of the housing and showing the main body of the fender and other parts in elevation. Fig. 5 is a detail perspective view of one of the adjustable stop collars. Fig. 6 is a fragmentary vertical section taken transversely of the shaft and housing, showing modified tripping means. Fig. 7 is a fragmentary horizontal section through the housing showing another modification in the tripping means.

In carrying out the present invention, I employ a stationary or non-rotary shaft 1 which is mounted adjacent to its opposite ends in bearings 2, one of which is shown as having a squared opening to receive one end of the shaft which is correspondingly squared as shown at 3 to prevent said shaft from turning.

The bearings 2 are supported by couplings 4 which are fixedly connected to the side frame bars 5 of the vehicle by means of U-bolts 6 which embrace an arm 7 of each coupling and also the front end portion of the adjacent frame bar 5 of the vehicle. Each coupling 4 is further provided with a lug 8 to receive a shaft 9 taking the place of the shackle bolts which connect the forward extremities of the frame bars 5 with the adjacent vehicle springs 10. By the means described, the shaft 1 is supported in fixed relation to the vehicle frame and is prevented from turning.

Surrounding the shaft 1 is a substantially cylindrical and tubular housing 11 which is mounted for a limited oscillatory movement on the shaft 1, the housing, for that purpose, being provided with end walls 12 formed with bearing openings for the shaft 1 as illustrated, for example, in Fig. 4.

Extending forwardly from the housing 11 and bearing a fixed relation thereto are substantially parallel tubular arms 13 the forward end portions of which are slidingly mounted in and telescopically related to tubular socket members or extensions 14 projecting rearwardly from and having a fixed relation to a pilot bar 15 which, as shown in Fig. 2, extends across the front of the vehicle and is of sufficient length to project in front of the wheels 16 of the vehicle to protect a person from being struck by said wheels. The pilot bar 15 may be provided with shoes 17 to contact with the ground and if desired, said shoes may be in the form of rollers as illustrated in the drawings.

Each of the tubular extensions 14 contains a coiled expansion cushioning spring 18 the rear end of which bears against the forward extremity of the adjacent tubular arm 13. Surrounding the end portion of the arm 13 within the socket or extension 14 is a sleeve 19 fast thereon and formed with pockets to receive anti-friction balls 20 which afford an easy sliding movement between the members 13 and 14. A stop collar 21 is fixedly secured to the rear end of each extension 14 and coöperates with the sleeve 19 to limit the action of the springs 18 in thrusting the pilot bar in a forward direction. The springs 18 allow the pilot bar to move to a limited extent in a rearward direction for a purpose which will appear.

Within the tubular arms 13 are mounted plunger rods 22 which are fastened at their forward extremities to the inside of the pilot bar 15 and which are connected at their rear extremities to wrist pins 23 on a pair of cams 24 mounted loosely for oscillatory movement on the non-rotary shaft 1. The cam faces 25 of the cams 24 act against springs 26 carrying latch displacing pins 27 which work through openings 28 in the housing 11 as best illustrated in Fig. 3.

In connection with the mechanism just described, I employ tripping means the same being best illustrated in Figs. 3 and 4 as comprising a pair of trip levers 29. These trip levers are mounted fast on a rock shaft 9, being fixed thereon by means of set screws 31 or their equivalent. Each trip lever 29 is provided with a latch 32 shown in the form of a curved arm having at the extremity thereof a latch pin 33 which enters the opening 28 in the housing 11 above referred to and serves to prevent said housing from turning when in the position shown in Fig. 3 with the main body of the fender upheld in a substantially horizontal position as shown in Figs. 1 and 3. By moving the lower end of the lever 29 in a forward direction, the latches 32 are rocked out of engagement with the housing 11 thereby releasing said housing to permit the fender to swing downward to its useful position. In addition to the latch 32, each lever is provided with a stop arm 34 arranged in the path of a stop lug or shoulder 35 on one of a pair of collars 36 one of which is shown in detail in Fig. 5. Each collar encircles the housing 11, is adapted to be turned around the same and to be fixed in relation thereto by means of a set screw 37. The construction just described permits the stops 35 to be adjusted in such relation to the stop arms 34 as to limit the downward movement of the fender to permit the pilot bar 15 to come as near as desirable to the road surface. The rock shaft 9 is provided with one or more rearwardly extending springs 38 which normally bear against a stop cross bar 39 terminally attached to the couplings 4, said springs serving to press the latches 32 into engagement with the housing 11 and permit disengagement of said parts when the fender is tripped.

One of the levers 39 is provided at its lower extremity with a headed pin or stud 40 which is received in a longitudinal slot 41 in a trip rod 42. This trip rod as shown in Figs. 1 and 2 is connected at its rear extremity to a fender tripping lever 43 so that the operator of the vehicle may trip the fender manually when he sees occasion therefor. The slot 41 allows the automatic tripping means and the manually controlled tripping means to be used independently of each other.

Surrounding the housing 11 is a collar 44 fast thereon and provided with a downwardly extending arm 45 having at its free extremity a pin or stud 46 which is received in a longitudinal slot 47 in a brake rod 48. The rod 48 as shown in Fig. 2 is connected at its rear extremity to a crank arm 49 on an oscillatory brake shaft 50 having other crank arms 51 to which the brake rods or connections 52 are attached. By the means just described, when the fender is dropped to its catching position, it serves to automatically operate the brake mechanism and arrest the further forward movement of the machine.

In order to insure the quick downward movement of the fender to its catching position, a coiled spring 53 is inclosed within the housing 11 and has one extremity thereof fastened to the housing at 54 and the other extremity thereof fastened to the non-rotary shaft 3 at 55. The spring 53 is so tensioned as to exert a downward pressure on the fender when the latter is tripped by the mechanism hereinabove described.

Wheel guards 56 are secured to the arms 13 of the fender by means of other arms 57 extending from the guards 56 inwardly and provided at their inner extremities with collars 58 adjustable lengthwise of the arms 13 and adapted to be held in fixed relation thereto by set screws 59. When the fender is in its depressed position, the wheel guards 56 lie close to or in contact with the vehicle wheels 16. The construction of the fender is completed as shown by extending cross bars or slats 60 between the arms 13.

Instead of the tripping means illustrated in Figs. 3 and 4 and hereinabove described, the plunger rods 22', as shown in Fig. 6, may be arranged to come in direct contact with the latches 32' for the purpose of pushing said latches out of engagement with the housing 11', the inward movement of the latches 32' being limited by stops 61 shown in the form of pins in Fig. 6. The latch 32' may also be operated manually by the same means shown in Figs. 1, 2 and 3 connected with the trip lever 29' of Fig. 6.

Another tripping means is illustrated in

Fig. 7 as comprising a latch 62 movable into and out of an opening 63 in one of the end walls of the housing 11ª, said latch being tripped automatically by means of the adjacent plunger rod 22ª, said rod having a beveled extremity 64 which coöperates with one end of a latch displacing pin 65 slidable through a guide 66 inside of the housing 11ª and arranged to contact with said latch for the purpose of pushing the latch out of engagement with the housing. The latch 62 is also manually controlled by means of a bell crank lever 67 connected with a hand lever controlled-trip rod 68 corresponding with the trip rod 42 above described, one arm of the lever 67 entering a groove 69 in the latch 62 for the purpose of displacing said latch and releasing the housing 11ª. The latch is normally held in latching position by means of a coiled expansion spring 70 which bears against the latch and is held from moving in the opposite direction by means of a collar 71 fast on the non-rotary shaft 1ª.

From the foregoing description, taken in connection with the accompanying drawings, it will now be understood that the fender may be tripped while in its elevated position, either automatically by the action of the pilot bar 15, or manually by means of the lever 43 and the connections described. When the pilot bar 15 strikes a person or object, it moves rearwardly to a limited extent and is cushioned by the springs 18. This effects a rearward movement of the plunger rods 22 which in turn oscillate the cams 24 and cause the latches 32 to be displaced so as to release the housing 11 and the fender arms 13 together with all parts carried by the latter. In case the driver of the machine sees the necessity for using the fender, he grasps the lever 43 and moves the upper end thereof rearwardly. This thrusts forward on the trip rod 42 causing a rocking movement of the shaft 30 and a corresponding movement of the latches 32 which are thereby moved out of latching engagement with the housing 11, thereby permitting the fender to be depressed quickly by the action of the spring 53. The spring 53, of course, acts to quickly depress the fender whether it is automatically or manually tripped.

The fender as a whole takes up very little more room than the ordinary fender or pilot bar now in use on automobiles but has the additional advantage of moving to a catching position and preventing a person or object from passing under the wheels and body of the machine.

It will of course be understood that the fender hereinabove described may be applied to any vehicle or car by slightly altering the connecting means between the frame of the fender and frame of the car or vehicle. These and other changes in the form, proportion, and minor details of construction may be resorted to without departing from the principle or sacrificing any of the advantages of the invention.

Having thus described my invention, I claim:—

1. In a car fender, the combination of a non-rotary shaft, means for supporting the same in fixed relation to a vehicle frame, a cam mounted to oscillate on said shaft, a tubular housing inclosing said cam and mounted for oscillatory movement on said shaft, arms extending from said housing and having a fixed relation thereto, a pilot bar supported by said arms and adapted to move rearwardly when subjected to impact, an operating connection between said pilot bar and cam actuated by the pilot bar and acting to oscillate said cam, and a fender upholding latch displaceable by said cam.

2. In a car fender, the combination of a non-rotary shaft, means for supporting the same in fixed relation to a vehicle frame, a cam mounted to oscillate on said shaft, a tubular housing inclosing said cam and mounted for oscillatory movement on said shaft, arms extending from said housing and having a fixed relation thereto, a pilot bar supported by said arms and adapted to move rearwardly when subjected to impact, an operating connection between said pilot bar and cam actuated by the pilot bar and acting to oscillate said cam, a fender upholding latch displaceable by said cam, and a spring connecting said shaft and housing and acting to depress the fender.

3. In a car fender, the combination of a non-rotary shaft, means for supporting the same in fixed relation to a vehicle frame, a cam mounted to oscillate on said shaft, a tubular housing inclosing said cam and mounted for oscillatory movement on said shaft, arms extending from said housing and having a fixed relation thereto, a pilot bar supported by said arms and adapted to move rearwardly when subjected to impact, an operating connection between said pilot bar and cam actuated by the pilot bar and acting to oscillate said cam, a fender upholding latch displaceable by said cam, a spring connecting said shaft and housing and acting to depress the fender, and means for limiting the downward movement of the fender.

4. In a car fender, the combination of a non-rotary shaft, means for supporting the same in fixed relation to a vehicle frame, a cam mounted to oscillate on said shaft, a tubular housing inclosing said cam and mounted for oscillatory movement on said shaft, arms extending from said housing and having a fixed relation thereto, a pilot bar supported by said arms and adapted to move rearwardly when subjected to impact, an operating connection between said pilot bar and cam actuated by the pilot bar and acting to oscillate said cam, a fender upholding latch displaceable by said cam, and manually operable means for displacing said latch.

5. In a car fender, the combination of a non-rotary shaft, means for supporting the same in fixed relation to a vehicle frame, a cam mounted to oscillate on said shaft, a tubular housing inclosing said cam and mounted for oscillatory movement on said shaft, arms extending from said housing and having a fixed relation thereto, a pilot bar supported by said arms and adapted to move rearwardly when subjected to impact, an operating connection between said pilot bar and cam actuated by the pilot bar and acting to oscillate said cam, a fender upholding latch displaceable by said cam, a manually operable lever for tripping said latch, a stop arm on said lever, and an adjustable stop coöperating with said stop arm and embodying a collar encircling said housing and adapted to be turned thereon, a set screw for said collar, and a shoulder on said collar adapted to contact with said stop arm.

In testimony whereof I affix my signature in presence of two witnesses.

ROBERT H. WILSON.

Witnesses:
E. C. JOHNSON,
H. BERG.

Copies of this patent may be obtained for five cents each, by addressing the "Commissioner of Patents, Washington, D. C."